United States Patent
Hiltz-Laforge et al.

(10) Patent No.: US 10,120,927 B2
(45) Date of Patent: Nov. 6, 2018

(54) TECHNOLOGY FOR GENERATING A MODEL IN RESPONSE TO USER SELECTION OF DATA

(71) Applicant: International Business Machines Corporation, Armonk, NY (US)

(72) Inventors: Jason Hiltz-Laforge, Ottawa (CA); Yvon R. Nonez, Orleans (CA); Alireza Pourshahid, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 14/729,962

(22) Filed: Jun. 3, 2015

(65) Prior Publication Data

US 2016/0357839 A1    Dec. 8, 2016

(51) Int. Cl.
*G06F 17/30*    (2006.01)

(52) U.S. Cl.
CPC ............... *G06F 17/30592* (2013.01)

(58) Field of Classification Search
CPC ......... G06F 17/30592; G06F 17/30477; G06F 17/30457; G06F 17/30489; G06F 17/30398
USPC ................................. 707/600, 603
See application file for complete search history.

(56) References Cited

U.S. PATENT DOCUMENTS

| | | | |
|---|---|---|---|
| 7,480,675 B2 | 1/2009 | Folting | |
| 7,716,167 B2 | 5/2010 | Colossi | |
| 8,255,368 B2 | 8/2012 | Cox | |
| 8,484,157 B2 | 7/2013 | Ortega | |
| 2007/0203933 A1* | 8/2007 | Iversen | G06F 17/30592 |
| 2007/0219957 A1* | 9/2007 | D'Hers | G06F 17/30592 |
| 2010/0235345 A1* | 9/2010 | Joseph | G06F 17/30457 707/713 |
| 2013/0166498 A1 | 6/2013 | Aski | |

FOREIGN PATENT DOCUMENTS

WO    20056106711 A1    11/2005

OTHER PUBLICATIONS

Wiak, et al., Using Oracle tools to generate Multidimensional Model in Warehouse, Electrical Review, ISSN 0033-2097, R. 88 NR 1a/2012.
"Dynamic, interactive creation of OLAP dimensions," IBM ip.com, Aug. 13, 2009, IPCOM000186229D.

* cited by examiner

*Primary Examiner* — James Trujillo
*Assistant Examiner* — Fariborz Khoshnoodi
(74) *Attorney, Agent, or Firm* — Anthony V S England; Ryan Lavis

(57) ABSTRACT

Dynamically generating a model for a report includes presenting a user with source data by a source application, wherein the source data is available for producing a report. Selections are received from the user indicating portions of the source data to potentially include in the report. In response to receiving the user selections, a computer system builder module generates an analytic processing model for the user selected portions of the source data.

17 Claims, 11 Drawing Sheets

401

402 404 406 408 410 412

| | A | B | C | D | E | F |
|---|---|---|---|---|---|---|
| 1 | COUNTRY | SALES REP | CITY | CUSTOMER | PRODUCT | SALES |
| 2 | USA | JONES | LA FOLLETTE | SAETEK | CAR | 4 |
| 3 | USA | JONES | LA FOLLETTE | SAETEK | VAN | 2 |
| 4 | USA | JONES | LA FOLLETTE | FELECTRICS | CAR | 2 |
| 5 | USA | JONES | LA FOLLETTE | FELECTRICS | VAN | 2 |
| 6 | USA | JONES | WHITNEY POINT | TRESLINK | CAR | 7 |
| 7 | USA | JONES | WHITNEY POINT | TRESLINK | VAN | 8 |
| 8 | USA | JONES | WHITNEY POINT | PLUSDDEXOL | CAR | 2 |
| 9 | USA | JONES | WHITNEY POINT | PLUSDEXOL | VAN | 3 |
| 10 | USA | JONES | LINO LAKES | HAYTRAX | CAR | 1 |
| 11 | USA | JONES | LINO LAKES | HAYTRAX | VAN | 1 |
| 12 | USA | SMITH | BROOKDALE | VIVARANEX | CAR | 1 |
| 13 | USA | SMITH | BROOKDALE | VIVARANEX | VAN | 0 |
| 14 | USA | SMITH | BROOKDALE | SILICOBAM | CAR | 1 |
| 15 | USA | SMITH | BROOKDALE | SILICOBAM | VAN | 2 |
| 16 | USA | SMITH | BROOKDALE | ZERDACKS | CAR | 1 |
| 17 | USA | SMITH | BROOKDALE | ZERDACKS | VAN | 0 |
| 18 | USA | SMITH | MIDDLETOWN | PLUSCAN | CAR | 1 |
| 19 | USA | SMITH | MIDDLETOWN | PLUSCAN | VAN | 2 |
| 20 | USA | SMITH | MIDDLETOWN | PHYSEND | CAR | 2 |
| 21 | USA | SMITH | MIDDLETOWN | PHYSEND | VAN | 2 |
| 22 | | | | | | |

*FIG. 4C*

| | A | B | C | D |
|---|---|---|---|---|
| 1 | COUNTRY | SALES REP | CITY | CUSTOMER |
| 2 | USA | JONES | CHICAGO | SAETEK |
| 3 | USA | JONES | CHICAGO | FELECTRICS |
| 4 | USA | SMITH | CHICAGO | TRESLINK |
| 5 | USA | SMITH | CHICAGO | PLUSDEXOL |
| 6 | USA | LANCASTER | CHICAGO | HAYTRAX |
| 7 | USA | ANDERSON | NEW YORK | VIVARANEX |
| 8 | USA | ANDERSON | NEW YORK | SILICOBAM |
| 9 | USA | ANDERSON | NEW YORK | ZERDACKS |
| 10 | USA | BAKER | NEW YORK | PLUSCAN |
| 11 | USA | BAKER | NEW YORK | PHYSEND |

| SAETEK |
| FELECTRICS |
| TRESLINK |
| PLUSDEXOL |
| HAYTRAX |
| VIVARANEX |
| SILICOBAM |
| ZERDACKS |
| PLUSCAN |
| PHYSEND |

| SAETEK | KEY1 |
| FELECTRICS | KEY1 |
| TRESLINK | KEY2 |
| PLUSDEXOL | KEY2 |
| HAYTRAX | KEY3 |
| VIVARANEX | KEY4 |
| SILICOBAM | KEY4 |
| ZERDACKS | KEY4 |
| PLUSCAN | KEY5 |
| PHYSEND | KEY5 |

| JONES | KEY1 |
| SMITH | KEY2 |
| LANCASTER | KEY3 |
| ANDERSON | KEY4 |
| BAKER | KEY5 |

| SAETEK | KEYA1 |
| FELECTRICS | KEYA1 |
| TRESLINK | KEYA2 |
| PLUSDEXOL | KEYA2 |
| HAYTRAX | KEYA3 |
| VIVARANEX | KEYB4 |
| SILICOBAM | KEYB4 |
| ZERDACKS | KEYB4 |
| PLUSCAN | KEYB5 |
| PHYSEND | KEYB5 |

← 604

| JONES | KEYA1 |
| SMITH | KEYA2 |
| LANCASTER | KEYA3 |
| ANDERSON | KEYB4 |
| BAKER | KEYB5 |

| CHICAGO | KEYA |
| NEW YORK | KEYB |

702 → [SAETEK, FELECTRICS, TRESLINK, PLUSDEXOL, HAYTRAX, VIVARANEX, SILICOBAM, ZERDACKS, PLUSCAN, PHYSEND]

*FIG. 7A*

702 → [SAETEK, (blank), FELECTRICS, TRESLINK, PLUSDEXOL, HAYTRAX, VIVARANEX, SILICOBAM, ZERDACKS, PLUSCAN, PHYSEND]

704 → [LA FOLLETTE, WHITNEY POINT, LINO LAKES, BROOKDALE, MIDDLETOWN]

*FIG. 7B*

702 → [SAETEK, (blank), FELECTRICS, TRESLINK, PLUSDEXOL, HAYTRAX, VIVARANEX, SILICOBAM, ZERDACKS, PLUSCAN, PHYSEND]

704 → [LA FOLLETTE, WHITNEY POINT, LINO LAKES, BROOKDALE, MIDDLETOWN]

706 → [JONES, (blank), SMITH, LANCASTER, ANDERSON, BAKER]

*FIG. 7C*

DIM TBL
802

| JONES | KEY1 |
| SMITH | KEY2 |

*FIG. 8A*

DIM TBL
802

| JONES | LA FOLLETTE | KEY1A |
| JONES | WHITNEY POINT | KEY1B |
| JONES | LINO LAKES | KEY1C |
| SMITH | BROOKDALE | KEY2A |
| SMITH | MIDDLETOWN | KEY2B |

*FIG. 8B*

DIM TBL
802

| SALES REP | CITY | KEY |
|---|---|---|
| JONES | LA FOLLETTE | KEY1A |
| JONES | WHITNEY POINT | KEY1B |
| JONES | LINO LAKES | KEY1C |
| SMITH | BROOKDALE | KEY2A |
| SMITH | MIDDLETOWN | KEY2B |

FACT TBL
804

| D1 | QUANTITY |
|---|---|
| KEY1A | 10 |
| KEY1B | 20 |
| KEY1C | 2 |
| KEY2A | 5 |
| KEY2B | 7 |

*FIG. 8C*

D2 DIM
TBL 808

| PRODUCT | KEY |
|---|---|
| CAR | KEY1 |
| VAN | KEY2 |

FACT TBL
804

| D1 | D2 | QTY |
|---|---|---|
| KEY1A | KEY1 | 6 |
| KEY1A | KEY2 | 4 |
| KEY1B | KEY1 | 9 |
| KEY1B | KEY2 | 11 |
| KEY1C | KEY1 | 1 |
| KEY1C | KEY2 | 1 |
| KEY2A | KEY1 | 3 |
| KEY2A | KEY2 | 2 |
| KEY2B | KEY1 | 3 |
| KEY2B | KEY2 | 4 |

D1 DIM
TBL 802

| SALES REP | CITY | KEY |
|---|---|---|
| JONES | LA FOLLETTE | KEY1A |
| JONES | WHITNEY POINT | KEY1B |
| JONES | LINO LAKES | KEY1C |
| SMITH | BROOKDALE | KEY2A |
| SMITH | MIDDLETOWN | KEY2B |

*FIG. 8D*

TECHNOLOGY FOR GENERATING A MODEL IN RESPONSE TO USER SELECTION OF DATA

BACKGROUND

The field of the present invention concerns dynamically generating a data model for a report, and, more particularly, generating the model responsive to user selected portions of source data.

In a database context, dimensions are defined that categorize and label data elements. The dimensions also provide a structure that enables filtering (also known as "slicing") and grouping (also known as "dicing") of the data elements. Commonly used dimensions categorize each data element according to its relation to people, products, place and time, for example. A numerical data element, which may be referred to as a "measure" or a "metric," is related to other data elements in the database by the defined dimensions. One measure may be a sales figure, for example, such as a number of units or dollar amount of products sold. It is common that a sales measure is associated with customer and product dimensions, for example, wherein for each sale a customer buys a product. Organization of sales measures by these dimensions allows filtering the sales to in order to present sales for selected customers and then allows grouping those selected sales by product, for example. While the above example describes a framework wherein sales measure data has customer data and product data dimensions, such a selected set of data may be referred to herein, according to another framework, as data in a sales dimension with customer and product "dimension hierarchies," or simply "hierarchies" (also referred to as "levels").

SUMMARY

Dynamically generating a model for a report includes presenting a user with source data by a source application module, wherein the source data is available for producing a report. Selections are received from the user indicating portions of the source data to potentially include in the report. In response to receiving the user selections, a computer system builder module generates an analytic processing model for the user selected portions of the source data.

System and computer program products relating to the above-summarized methods are also described and claimed herein.

BRIEF DESCRIPTION OF THE DRAWINGS

The above described aspects of the present invention and others, including objects, forms, features and advantages, will become more apparent from the following detailed description of illustrative embodiments thereof, which is to be read in connection with the accompanying drawings. The drawings are not to scale and are, together with the detailed description, for clarity in facilitating the understanding of persons skilled in the related art. In the drawings:

FIGS. 4A, 4B, 4C and 4D illustrate various configurations of data accessibly by a source application module, which may be user selected for including in a report, according to embodiments of the present invention;

FIGS. 6A, 6B and 6C illustrate a model generated by a model builder module responsive to successive user selections of portions of data shown in FIG. 4D, according to embodiments of the present invention;

FIGS. 7A, 7B and 7C illustrate a model generated by a model builder module responsive to successive user selections of portions of data shown in FIG. 4B, according to embodiments of the present invention; and FIGS. 8A, 8B, 8C, and 8D illustrate a model generated by a model builder module responsive to successive user selections of portions of data shown in FIG. 4C, according to embodiments of the present invention.

DETAILED DESCRIPTION

Figure 1:
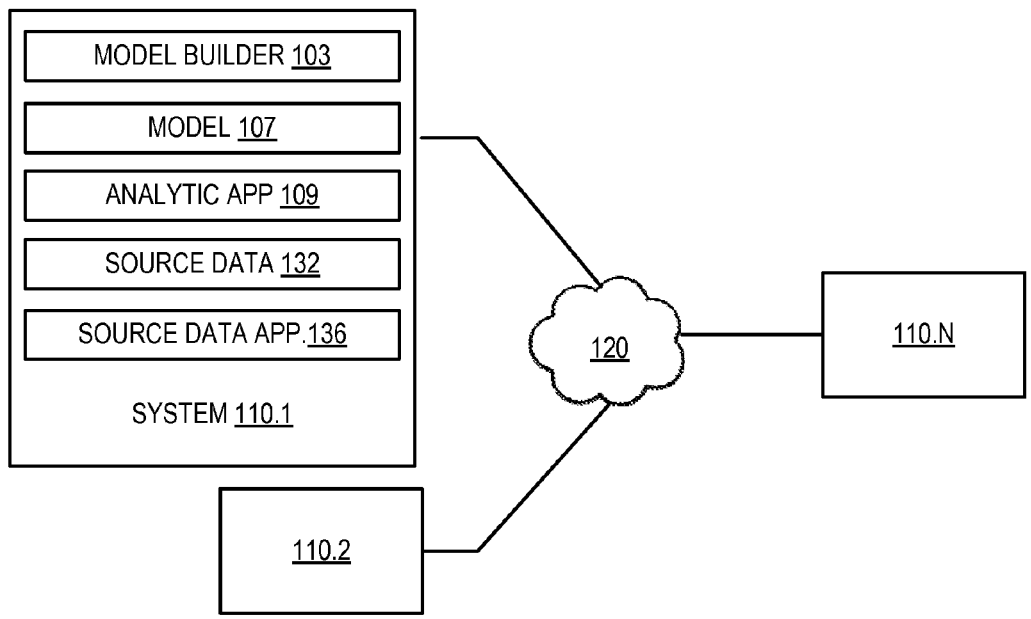
FIG. 1 illustrates a networked computer environment, according to embodiments of the present invention.

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

An online analytical processing ("OLAP") model is a powerful data analysis construct that fits with the above described database aspects. The model's data structure allows an OLAP application module to quickly aggregate the data according to its pre-defined dimension and measurement attributes. This enables quick navigation through data of the model and enables quick, efficient execution of data analysis tasks.

Regarding structure of OLAP model data, one such model includes the data itself in a multidimensional "hypercube." The data in this model is referred to as simply a "cube" and this type of model is referred to as an "OLAP cube model." Another type of OLAP model, a dimensionally modeled relational ("DMR") model, does not contain the data itself. It provides OLAP functionality via metadata for data that is in a relational model. Regardless of whether an OLAP model contains the underlying data itself or merely metadata, it indicates combinations of properties of the data and may be based upon a relational database having a star schema, for example. A star schema has a central fact table and one or more dimension tables joined to the fact table. Accordingly, an OLAP model for a star schema relational model is built around a central fact table, which contains a set of measures and describes how to aggregate data from the fact table across the OLAP model's dimensions. OLAP models may also be based on a relational snowflake schema, for example. A snowflake schema is like a star schema, but with one or more dimensions defined by multiple tables. OLAP models may also model and optimize other relational model schemas and other data sets for which a relational model does not exist.

Herein disclosed, according to embodiments of the present invention, is a builder module for performing a process that automates computer system creation of an OLAP model data set from less structured data, so that certain aspects of manual setup are not required by a human modeling expert. As previously stated, the model's data structure allows an OLAP application module to quickly aggregate the data according to its pre-defined dimension and measurement attributes. In some embodiments of the present invention, the model's data structure that is built by the module includes both a logical structure for a database and the underlying data of the database, such as the database structures and data as described in examples herein below. In other embodiments of the present invention, the model's data structure that is built by the module includes the logical structure for the database but merely refers to the underlying data thereof, rather than including the underlying data in the model's data structure.

Further, the builder module, according to embodiments of the present invention, not only automatically creates the OLAP model organization of the data set, but it does so based on more than state of input data merely at a time when the data is imported. Specifically, the builder module receives source data, also known as input data, which may include the builder module importing source data and may include the builder module merely receiving user input that identifies source data as particular data in an executing application module, such as particular data in a spreadsheet or set of spreadsheets (i.e., rows, columns, sheets, or any combination thereof) or all data in a particular spreadsheet or set of spreadsheets, for example.

Then, after the source data has been thus received or identified, the builder module then collects information for a time about usage of the data, which identifies which part of the source data the user intends to use or actually does use and how it is or will be used. In this context, data "usage" refers to the user performing operations on at least some of the source data in an executing application module, including any one or more of operations such as data selecting, manipulating, querying, navigating, changing, displaying, etc. The builder module then uses this collected data usage information as OLAP model generation input for identifying what part of the source data to include in the model and how to organize the data that is included, e.g., what dimension tables to generate and how to define relationships among portions of the included data, so that when the user signals the builder module to generate the model, the builder module is not limited to gross assumptions about use cases based merely on the source data by itself.

In this way, the OLAP model is not created based merely on static data, i.e., merely the state of the source data itself when imported for model generation. This is in contrast to an arrangement in which organization of the OLAP model data is defined by source data preprocessing at the time when source data is imported, i.e., processing before the above described imported data usage, wherein the preprocessed data remains organized that way unless and until work is done to change the model, regardless of how the data is used after it is imported. While human effort for creating an OLAP model has been reduced somewhat by recent tools that assist in model definition when importing data, such as data of a relational model or a spreadsheet, for example, these tools still create a fixed OLAP model when the source data is imported without collecting information about data usage subsequent to the importing. In such an arrangement in which the OLAP model data is defined at the time when source data is imported, if the model contains a time dimension with hierarchical year and month attributes and measures, for example, additional years of data may be added without changing the model and may thereby become available to users of the model. However, until the model is changed, the OLAP application module's query and display of data is limited to the same year and month structure, and if the model has two data items in different dimensions, it may not allow drilling down in the data to navigate from one item to the other.

According to embodiments of the present invention, the model builder process delays creation of an OLAP model, wherein after importing or creating data the model builder process waits to create the model until the process detects user interaction with source data that indicates how the data will be used, which may include building the model in stages, such as at particular events during the course of a user building (i.e., authoring) a report (i.e., defining which source data to include in a report), for example, which is before executing a query or command that actually produces the report. (Herein building a report includes building a view. That is, the term "report" encompasses a view. The term "report" also encompasses a query result presentation.) This differs from creating an OLAP model based on source data without the benefit of information about usage of the source data gained from the process of building reports. According to embodiments of the present invention, stages of building a report are intertwined with stages of creating the model and importing data identified for the report into the model. One such report building stage may include the user selecting parts of the source data for the report. For example, in a running spreadsheet application module, a user may select data for a report, such as data in selected columns and rows of the spreadsheet. Thus, the model builder module responsively creates an OLAP model stage-by-stage responsive to user selection of portions of source data for the report, piece-by-piece. That is, a first report generation stage occurs, wherein the user selects first data. The first report generation stage is followed by a first model creation stage, wherein the first selected data is added to the model. Then a second report generation stage occurs, in which second data is selected, which is followed by a second model creation stage, etc.

In the manner described above, an expert modeler or automated system does not create the model before the data is actually selected for use in a report, according to embodiments of the present invention. Instead, the builder module creates an OLAP model at report authoring time. In this way, the OLAP model tends to be minimal, since it contains only what the user has selected for the report, plus any extra data that the builder module determines is likely in the same hierarchical structure as the data in current report, as described herein below. Also, the model created by the builder module is persisted with the report the user is creating.

Benefits arise from basing an OLAP model on nesting of data created by a user when the user generates report, such as in the following star and snowflake schema model examples. The examples show how the user defines relations among data items in the report and how the OLAP builder module uses this to define relations among data items for the OLAP model.

FIG. 1 illustrates an example computing environment 100, according to embodiments of the present invention. As shown, computing environment 100 includes computer systems 110.1, 110.2 through 110.N and connects via network 120, which may be public or private. Systems 110.1, 110.2, etc. include data and application modules, such as model builder application module 103, model data 107, analytic application module 109 source data 132 and source data application module 136, wherein the application modules are configured to perform tasks. (According to embodiments of the present invention modules 109 and 136 may be part of the same application.) Model builder 103 is configured to build model data 107 as described herein above, where the model building by module 103 is responsive to user selection of portions of source data 132 in source data application module 136 and where model data 107 enables analytic application 109 to more efficiently query, analyze, manipulate and present the user selected portions of source data 132 in a report, as described herein below.

Figure 2:
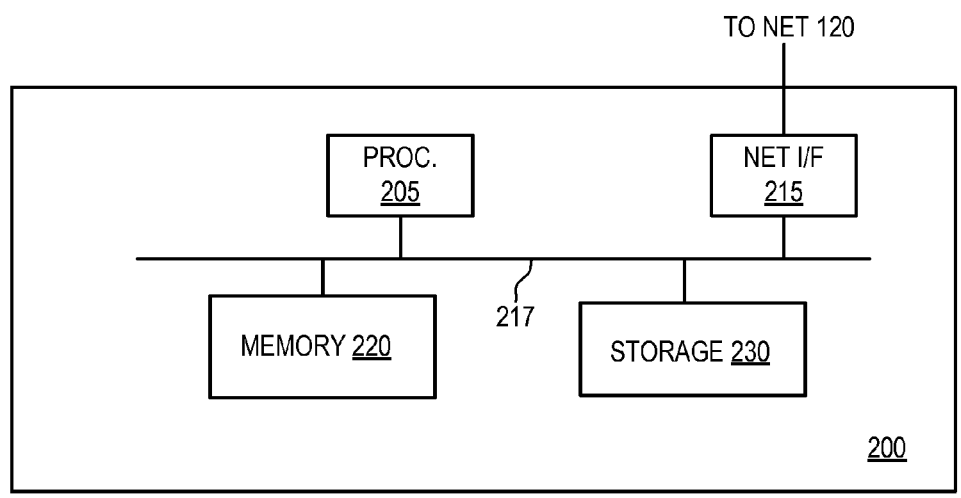
FIG. 2 is a block diagram of devices shown in FIG. 1, according to embodiments of the present invention.

FIG. 2 illustrates details of a computer system 200 suitable as computer systems 110.1, 110.2, etc. according to embodiments of the present invention, wherein system 200 includes at least one central processing unit (CPU) 205, network interface 215, interconnect (i.e., bus) 217, memory 220 and storage device 230. CPU 205 may retrieve and execute programming instructions stored in memory 220. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random access memory, which includes data and program modules for run-time execution, such as model builder 103, according to embodiments of the present invention. It should be understood that system 200 may be implemented by other hardware and that one or more modules thereof may be firmware.

Model builder module 103, data model 107, analytic application 109 and source data 132 shown in FIG. 1 may be run-time instances in memory 220 of data and program modules from storage 230. Storage 230 may be a disk drive storage device, for example. Although shown as a single unit, storage 230 may be a combination of fixed and/or removable storage devices, such as fixed disc drives, floppy disc drives, tape drives, removable memory cards or optical storage, network attached storage (NAS), or a storage area-network (SAN).

The above-described examples and depictions in the Figures are not meant to imply architectural limitations. Further, embodiments of the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

Figures 4A, 4B:
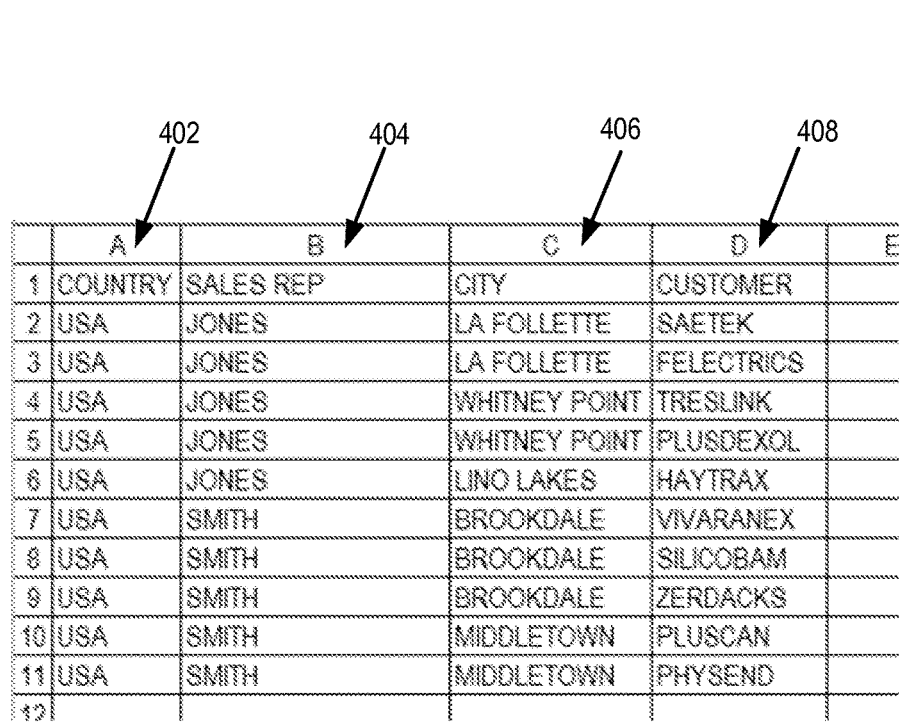

Referring now to FIG. 4A, source data 401 imported into or created in the spreadsheet application module, for example, includes data in columns having headers with labels that indicate attributes including countries 402, Cities 406, regional Sales Representatives 404, Customers 408 and product Sales 410 quantities. The values in the columns below the headers indicate a 1 to N mapping between Sales Representative data 404 and Customer data 408 attributes, i.e., each Sales Representative 404 has a number of Customers 408 and each Customer 408 has only one Sales Representative 404, as may be seen by the Customer/Sales Representative associations indicated by rows. For example, rows 2-6 indicate that Sales Representative Jones has Customers Saetek, Felectrics, Treslink, Plusdexol and Haytrax, since Sales Representative Jones is in the same rows with those Customers. The source data values also indicate by row associations that Sales Representatives Jones and Smith are each associated with only a single Country, i.e., USA. (In the illustrated instance, both are associated with the same Country.) Also, the single Country, USA has more than one Sales Representative, Jones and Smith. So this is another 1 to N mapping. Further, the Sales Representatives 404 are associated with Cities 406. In the illustrated example, each of the two Sales Representatives 404 are associated with more than one City 406 and each City 406 has only one regional Sales Representative 404, which indicates another 1 to N mapping. Also, the source data 401 indicates that Cities 406 and Customers 408 are associated in a 1 to N mapping. Likewise, Country 401 and the particular Cities 406 of this source data have a 1 to N mapping.

In alternative terminology, "1 to N" and "N to 1" are commonly described as "one to many" and "many to one." Likewise, "N to N" is commonly described as "many to many." However, it should be understood that in this context "N" and "many" do not necessarily imply more than two, although it may happen in some cases that "N" entails many instances.

Figure 3A:
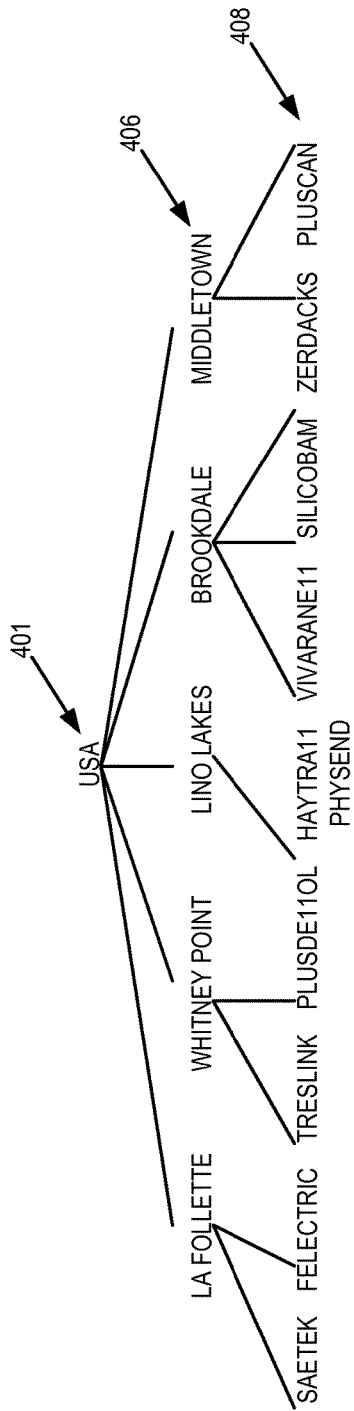
FIGS. 3A, 3B, 3C and 3D illustrate first second and third hierarchies, according to embodiments of the present invention.
Figure 3B:
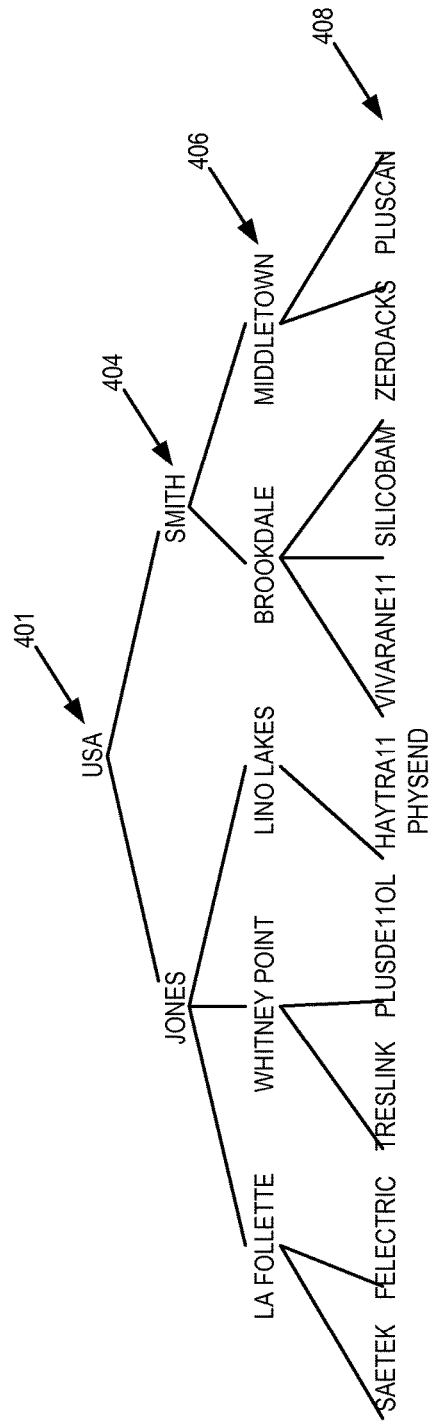
Figure 3C:
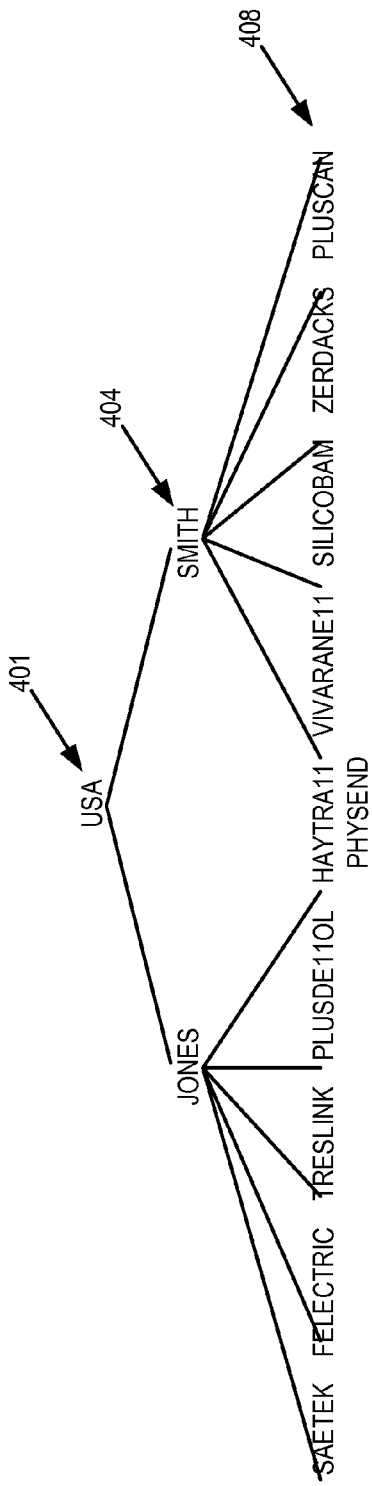

Given this underlying organization of the source data, there are several possible hierarchies that the user may create in a report, some of which are illustrated in FIGS. 3A, 3B, 3C and 3D. In FIG. 3A, Cities 406 are subordinate elements of Country 402, each City 406 belonging to one Country 402; and Customers 408 are subordinate elements of Cities 406, each Customer 408 belonging to one City 406. In FIG. 3B, Sales Representatives 404 are added to the hierarchy of FIG. 3A, wherein Sales Representatives 404 are subordinate elements of county 402, each Sales Representative 404 belonging to one Country 402; Cities 406 are subordinate elements of Sales Representatives 404, each City 406 belonging to one Sales Representative 404; and Customers 408 are subordinate elements of Cities 406, each Customer 408 belonging to one City 406. In FIG. 3C, Cities 406 are omitted from the hierarchy of FIG. 3B, so that Sales Representatives 404 are subordinate elements of the Country 402, each Sales Representative 404 belonging to the one Country 402; and Customers 408 are subordinate elements of Sales Representatives 404, each Customer 408 belonging to one Sales Representative 404.

The model builder module creates a model based on nesting indicated by the source data 401 portions that the user identifies for a report. In a report in which the user includes Sales Representatives 404, Cities 406 and Customers 408, but not countries 402, for example, the builder module generates an OLAP model dimension that has a hierarchy like the lower portion of FIG. 3B, i.e., without countries.

More specifically, the first time the user selects a portion of source data 401, the model builder module generates a first dimension for the model. Responsive to the user selecting the Sales Representative 404 column as initial data for the report, for example, the model builder module generates a Sales Representative dimension in the model. As the first data in the model, the Sales Representative data represents a new dimension. The model builder module is able to identify the selected data as Sales Representative data due to the column heading for the data 404, which is in row 1.

Figure 5A:
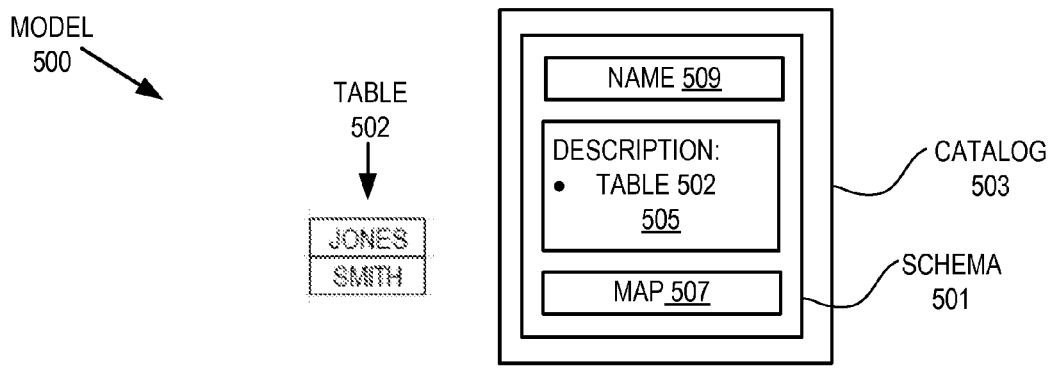
FIGS. 5A, 5B and 5C illustrate a model generated by a model builder module responsive to successive user selections of portions of data shown in FIG. 4A according to embodiments of the present invention.

Referring to FIGS. 4A and 5A, a model 500 is shown that is generated by a model builder module responsive to user selection of portions of data 401 shown in FIG. 4A in a spreadsheet application module, according to embodiments of the present invention. Adding the Sales Representative data 404 as first data for model 500 for a new report includes the model builder generating a Sales Representative dimension table 502 for the selected data, as shown, which is thereby included in data structure of the model 500 as a first dimension. Since this is the first data selected, the builder module creates a name 509 for a new schema 501 and adds the name 509 to a catalog 503 of the database, according to embodiments of the present invention. For tables that it creates responsive to user selection of data for the new report, model builder 103 associates the tables with the newly named schema 501. That is, for example, when the user selects Sales Representative data 404, the model builder executes a statement to create table 502 therefor, which adds a logical description 505 of table 502 to catalog 503 for the named schema. Description 505 may also include, for example, a name for the table that is unique among any tables and views that already exist in the schema, an ordered list of declarations (name, data type) for columns of the table, and a list of table content constraints.

In the herein described embodiments of FIGS. 5A through 5C, 6A through 6C and 7A through 7C, the model builder generates a snowflake schema, wherein for newly selected data the model builder generates a new table, regardless of whether the new data is for a new level of an existing dimension, and wherein model builder 103 generates, for the named schema, a mapping data structure and a description thereof in catalog 503, where the mapping data structure maps together any levels of a common dimension. In another embodiment, illustrated in FIGS. 8A through 8C herein, for example, the model builder generates a star schema, in which one dimension table may include more than one level of a dimension, so that for newly selected data the model builder adds the data to an existing dimension table if the model builder determines the new data is for a new level of the existing dimension.

Figure 5B:
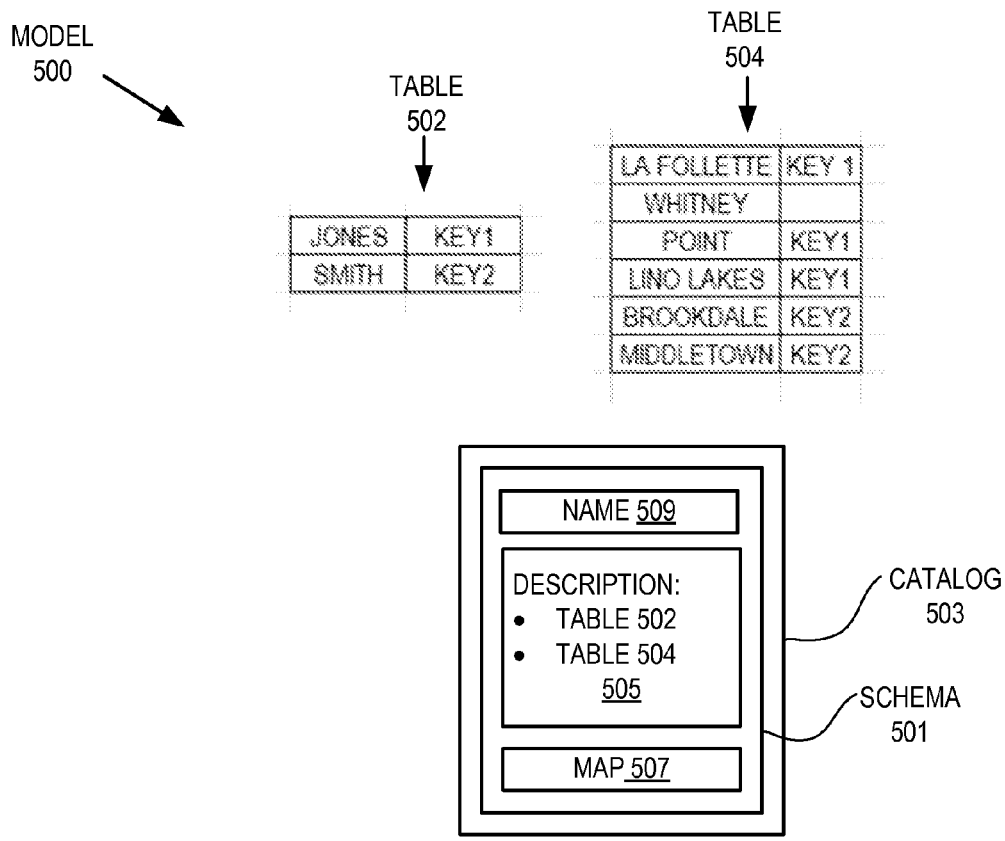

Next, responsive to the user selecting another set of data to the present report that is not a metric, e.g., Cities 406 column in this example, the model builder module generates a Cities level in model 500. Referring to FIG. 5B, this includes generating a Cities table 504 and description thereof in catalog 503 for the named schema 501, where table 504 contains the selected Cities data 406, according to embodiments of the present invention. The model builder module is, once again, able to identify the attribute to which the selected data is related, i.e., Cities, due to the data's column heading. The model builder creates the Cities level responsive to detecting that the current model does not yet have data for this attribute and also that the selected Cities data maps in 1 to N fashion to the Sales Representative data already in the model. The 1 to N mapping indicates the Cities data may be added as a level to the existing dimension created for Sales Representative data 404. Since the Sales Representative dimension is already in the model as dimension table 502, the model builder adds the Cities table 504 to the model as a level associated with the previously added dimension table 502 for Sales Representatives 404 by adding a data structure 507 that indicates the relation, where data structure 507 may be a mapping table, and also by linking keys. In the illustrated embodiment of FIGS. 5A through 5C, keys in the respective tables 502 and 504 for the Sales Representative data 404 and Cities data 406 provide the linkages. (In different embodiments, the linking by keys may be done in different ways and may include keys in data structure 507.) The keys link respective Sales Representatives to respective Cities, according to the associations indicated by source data 401 rows, wherein respective Sales Representatives 404 are in source data 401 rows with respectively associated Cities 406. In the illustrated embodiment of FIGS. 5A through 5C, the key that model builder generates for Sales Representative Jones, i.e., Key1, matches the key generated for Cities La Follette, Whitney Point and Lino Lakes, which is also "Key1," since Jones is on the same lines with those Cities in source data 401, while the key that model builder generates for Sales Representative Smith, i.e., "Key2," matches the key generated for Cities Brookdale and Middletown, also "Key2," since Smith is on the same lines with those Cities in source data 401.

Figure 5C:
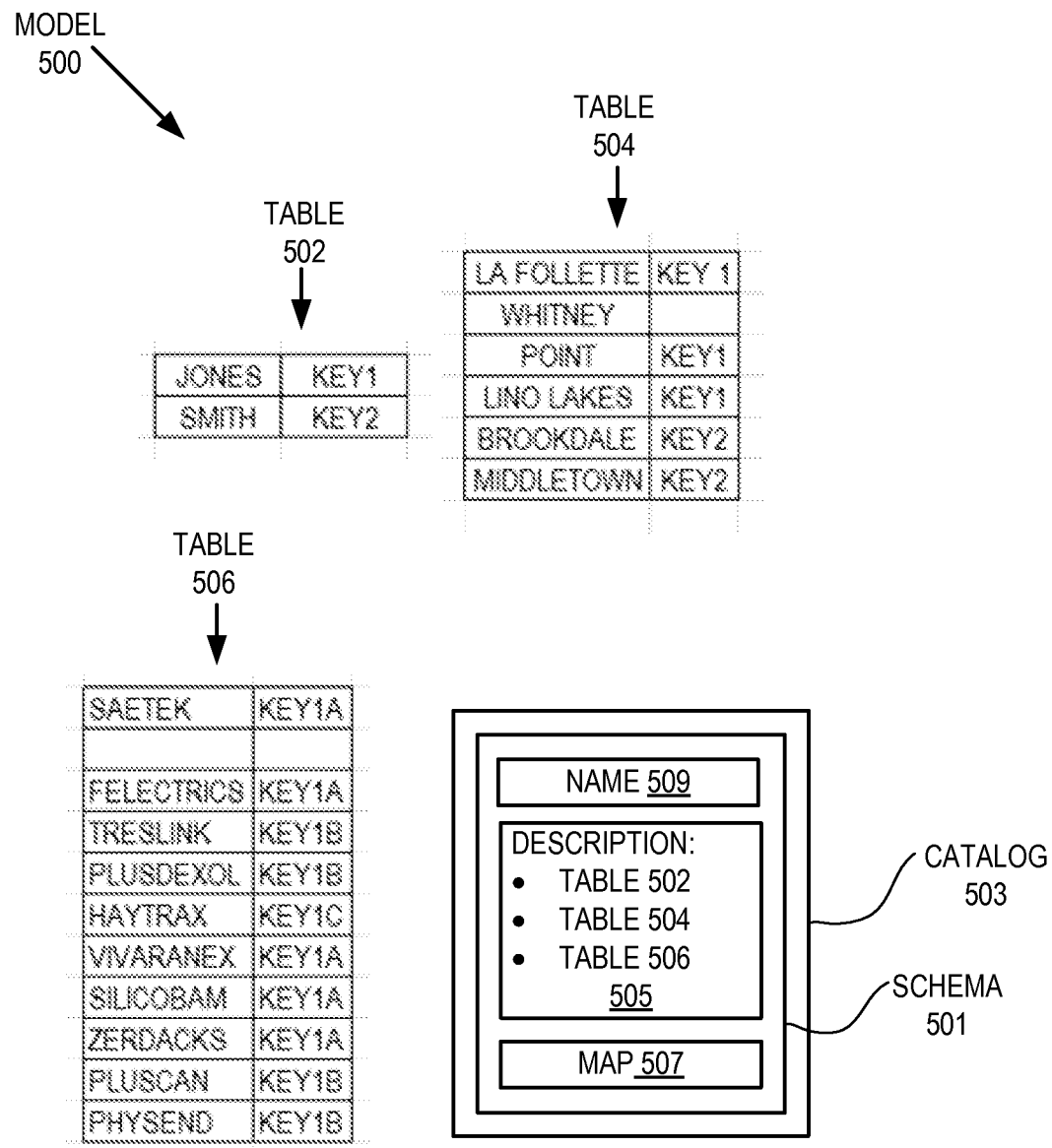

Next, responsive to the user selecting the Customer 408 column for the report, the model builder module generates a Customer level in the model. Referring to FIG. 5C, this includes generating a Customer table 506 and description thereof in catalog 503 for the named schema and includes adding the Customer level indication to data structure 507 for the user selected Customer data 408, according to embodiments of the present invention, where the model builder is able to identify the attribute to which the selected data is related, i.e., Customers, due to the data's column heading. Once again, the model builder creates the level responsive to detecting that the current model does not yet have data for this attribute and also that the selected data maps in 1 to N fashion to data that is already included in the model. In this case, the model detects that the selected Customer data 408 maps in 1 to N fashion to the Sales Representative data 404 and also in 1 to N fashion to the Cities data 406, so the model builder generates the Customer level in such a way as to map the Customer data 408 to both Cities 406 and Sales Representatives 404. To do this, according to embodiments of the present invention, the model builder adds data to data structure 507 that indicates the relation and provides linking keys. (As previously stated, in different embodiments the linking by keys may be done in different ways and may include keys in data structure 507.) In the presently illustrated embodiment, the linking adds portions to the keys in the Cities table 504, so that the initially created portion of each key, as described and illustrated for FIG. 5B, remains the same and still matches its respective key in the Sales Representative data 404 in table 502, but the added portion of each City 406 key corresponds to a corresponding portion of the respective key that the model builder generates for the Customer table 506 to link each respective Customer 408 to its City 406, as indicated by the source data 401 rows. For example, the key initially generated (FIG. 5B) for the City 406 of La Follette was initially "Key1," to match the key initially generated for Sales Representative 404 Jones. When the Customer data 408 is added (FIG. 5C), a portion "A" is added to the key "Key1" that was initially generated (FIG. 5B) for the City 406 of La Follette, yielding a revised key "Key1A." Likewise, this same key "Key1A" is assigned to Customers 406 Saetek and Felectrics in Customer table 506, since they are Customers 408 in the City 406 of La Follette.

With this structure for the OLAP model data, a database application module is enabled to drill up and down for Sales Representatives 404 along either or both of the City 406 and Customer 408 levels, and likewise for Cities 406 along the Customer 408 level, as well as vice versa. The model correspondingly allows calculations that count Customers 408 per Sales Representative 404, for example, where each such calculation is performed along a single path between two levels via corresponding keys of respective Customers and Sales Representatives in the Customer table 506 and Sales Representative table 502. Likewise, the model also allows calculations that count Cities 406 per Sales Representative 404, for example, where each such calculation is performed along a single path between two levels, since direct City-Sales Representative links are included in the model via the keys in the City table 504 that correspond to the keys in the Sales Representative table 502. Likewise, the model also allows calculations that count Cities 406 per Customer 408, for example, where each such calculation is performed along a single path between two levels, since direct City-Customer links are included in the model via the keys in the Customer table 506 that correspond to the keys in the City table 504.

In the above examples, each Sales Representative has more than one City, but each City has only one Sales Representative, i.e., a 1 to N relation of Sales Representatives to Cities. In a different situation, where a City has more than one Sales Representative, but each sales rep has a single City, for example, i.e., a 1 to N relation of Cities to Sales Representative, then the model builder would switch these two levels. This is illustrated in FIGS. 4D and 6A through 6C, which also illustrate the user selecting data in a sequence other than top down in the hierarchy. (Certain actions performed and data structures created by the model builder as described above are omitted in the following descriptions of model building illustrated in FIGS. 6A through 6C, FIGS. 7A through 7C and FIGS. 8A through 8D. This is in order to focus on particular issues, not to suggest that these actions and data structures are omitted.)

Figure 3D:
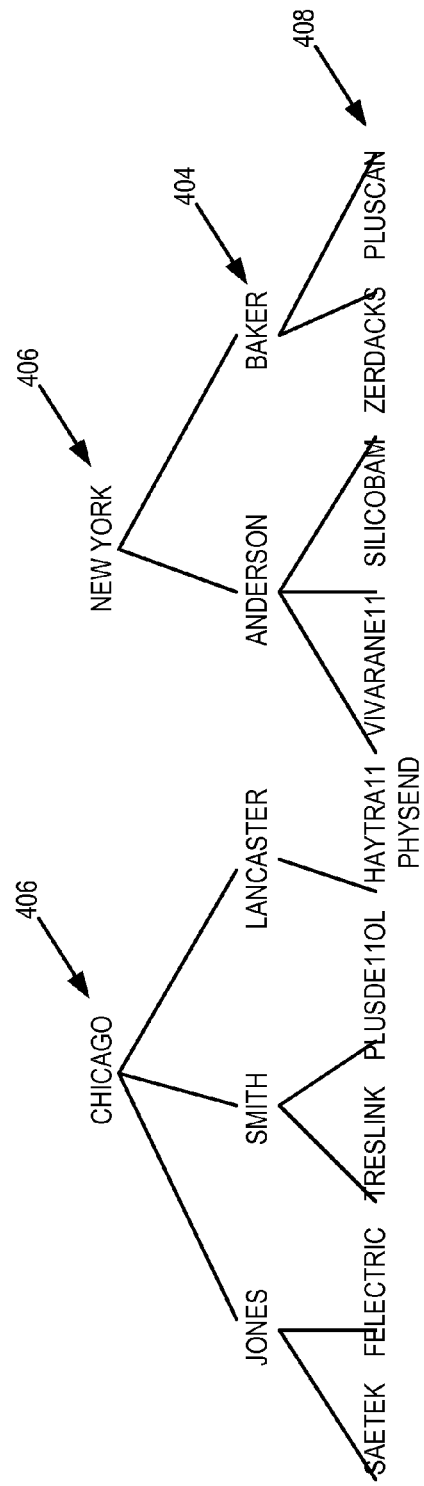

Referring now to FIG. 6A together with FIGS. 3D and 4D, based on 1 to N relationships City data 406 is highest in a hierarchy of the illustrated City 406, Customer 408, and Sales Representative 404 data. Next in the hierarchy is Sales Representatives 404, then Customers 408. The user in the illustrated instance, however, first selects Customers 408 to include in a report, then Sales Representatives 404, then Cities 406. This illustrates that the model builder will, in this circumstance, still generate a dimension table 602 having Customer data 408 for model 600 responsive to selection of the first data and will add to model 600 (FIG. 6B) responsive to selection of the second data portion, for Sales Representatives 404, such that Sales Representatives 404 are a level above the Customers 408, as may be seen by comparison of the keys in Customer table 602 and Sales Representative table 604 of FIG. 6B. That is, the model builder generates respectively different keys for each respective attribute at the higher level in the hierarchy, Sales Representatives, so that all the keys are unique in table 604. Regarding the lower level in this example, i.e., Customers, the model builder generates the same key for each Customer as the Customer's respective Sales Representative, so at least some keys are repeated in Customer table 602. In general, any object at a level that has more than one object below it in a next level down of a hierarchy must have a unique key.

Since the user selects the highest level last in this example, the model builder revises the keys of the earlier generated tables 602 and 604 differently than in the preceding example of FIGS. 5A through 5C, in which the user selected data in a top down fashion. In the present example, the model builder generates keys unique for each City in City table 606, where the beginning portion of each key is unique to each City, and the model builder modifies the keys of Sales Representative table 604 and Customer table 602 to add the new matter from each respective City table 604 key to the beginning portion of each corresponding Customer table 602 key and Sales Representative table 604 key. Specifically, for example, the model builder generates a key "KeyA" for Chicago in the City table key 606 key and modifies each key for Jones, Smith and Lancaster in the Sales Representative table 604 to include the new "A" matter in their keys, since those Sales Representatives are associated with Chicago. Likewise, the model builder does the same for keys in the Customer table 602, i.e., for Customers associated with Chicago. Likewise, the model builder generates a key "KeyB" for New York in the City table 606 key, modifies each key for Anderson and Baker in the Sales Representative table 604 to include the new "B" matter in their keys, since those Sales Representatives are associated with New York, and similarly modifies each key in the Customer table 602, i.e., for Customers associated with New York.

It should be appreciated from the above that since the model builder builds the model from data in a report, both the model and the report are empty until the user initially adds some data to the report. This first addition of data requires a new dimension to be created in all cases. Subsequent additions of data require the model builder to determine whether to add a level to an existing dimension or create a new dimension. Creating a new dimension for new data in the report is required when there is only an N to N mapping of the new data to all existing data in the report and model. That is, there is no existing dimension/hierarchy to which add the new data if there is no 1 to N or N to 1 mapping of the new data to any existing data in the model. In the above examples, the model builder generates a model with Sales Representatives, Cities and Customers in a single dimension with three levels, such that the outer most level, i.e., bottom level, which is Customers in these examples, has a 1 to N relationship with the second level, and the second level has a 1 to N relationship with the third level. Note that this single dimension model works because of the 1 to N relations. If one or more of the Sales Representatives have more than one City and one or more of the Cities have more than one Sales Representative, for example, then they cannot both be in the same hierarchy. Consequently, the model builder represents them in different dimensions in the OLAP model.

Referring now to FIG. 4B, an example is shown of source data 401 in which one or more of the Sales Representatives have more than one City and one or more of the Cities have more than one Sales Representative, which is an N to N mapping. In one such N to N instance in the example, Jones is a Sales Representative assigned to La Follette and Whitney Point, but La Follette also has Lancaster as a Sales Representative.

FIGS. 7A through 7C illustrate the user selecting source data 401 of FIG. 4B, wherein the user first selects Customers 408 to include in a report, then Cities 406, then Sales Representatives 404. FIGS. 7A through 7C illustrate that the model builder, in this circumstance, first (FIG. 7A) creates a dimension for the first data the user adds to the report, i.e., the Customer data 408, which includes generating a Customer table 702 and Then, when the user adds City 406 data to the report, the model builder adds the City 406 data to a level of the dimension created for the Customer 408 data, which includes the model builder now adding a City table 704 and generating keys (not shown) for tables 702 and 704 relating each City to each Customer, as shown (FIG. 7B), according to an embodiment of the present invention.

Next (FIG. 7C), when the user adds the Sales Representative 404 data to the report, the model builder creates a second dimension in the model for the Sales Representative 404 data, since the Sales Representatives do not have a 1 to N relation to any of the model data. Creating the second dimension in the model for the Sales Representative data includes adding Sales Representative table 706 and modifying keys (not shown).

When the model builder creates a new dimension, it looks at source data 401 to find cases where it can expand the new dimension by adding levels. If there is other source data not already in the model in which data of one attribute has a 1 to N mapping to new data the user just added for which the model builder created a new dimension and if no other data has an attribute with 1 to N mapping to the new data, then this represents a case where there is no ambiguity about what can be placed in a next level of the new dimension. The model builder, therefore, automatically adds the source data having this one attribute to the model, in order to allow for easy navigation in the resulting report. For example, if the user adds data having a Years attribute to the report and the model builder generates a new dimension for the Years attribute, and Months is the only source data that has not been added to the model and that has a 1 to N mapping to Years, then the model builder automatically adds Months data as the next level in the new dimension, so that the new dimension then has Years and Months levels.

Still further, when the model builder first automatically adds source data responsive to the above described new dimension and 1 to N mapping condition, the model builder also looks at the source data 401 to find cases where it can add still more levels due to the first automatic addition of source data. That is, the model builder looks for data that is the only source data having 1 to N mapping to data that was automatically added for a new dimension. For example, if the model builder finds that Days data is the only source data having 1 to N mapping to the above described newly and automatically added Years data, then the model builder also adds the Days data as a new level to the new dimension, so that the new dimension then has Years, Month and Days levels.

The above examples have shown dimensions and dimension tables, which provide categories for a report. However, metrics tend to be a central focus of reports. A user may select dimensions prior to selecting a metric, but a user typically selects at least one metric to include in a report. FIGS. 8A through 8D provide an example of this metric aspect, where the example is based on source data of FIG. 4C. FIG. 8B also illustrates that adding a new portion of a dimension table for creating a new hierarchy, as described for a snowflake schema in the earlier examples shown in FIGS. 5B and 5C, FIGS. 6B and 6C and FIG. 7B, may be done for a star schema by generating an extra column in an existing dimension table, according to embodiments of the present invention.

As shown in FIG. 8A together with FIG. 4C, responsive to the user selecting first data for the report, which is Sales Representatives 404 in this example, the model builder creates a first dimension, which includes generating a dimension table 802 for Sales Representatives 404, including keys. In the illustrated instance the user then selects additional data for the report, where the additional data is not a metric, as shown in FIG. 8B. In this example, the user selects City data 406. Since there is a 1 to N relationship between Sales Representatives 404 and Cities 406, the model builder adds the City data 406 to the existing dimension table 802 rather than creating a new table. Note that here and in the other examples presented, when the user selects portions of data 401 for the report, the model builder also updates OLAP model metadata stored in a data structure such as catalog 503 outside schema 501 as shown in FIGS. 5A, 5B and 5C, such as the names of the levels in the hierarchy (e.g., Sales Representative, City).

Next, as illustrated in FIG. 8C, responsive to the user inserting a metric column from the source data, e.g., Sales 412 quantity, the model builder creates a fact table 804 having a column for the Sales 412 quantity and having keys in a key column, where each key uniquely links its row of Sales 412 quantity to a corresponding row of Sales Representatives 404 and City 406 dimensions in dimension table 802 (also referred to as "D1"), i.e., in the star schema again.

Note that source data 401 in FIG. 4C has rows that include duplicate data items, such as rows containing Sales Rep=Jones and City=La Follette, for example, and that in the illustrated example of FIGS. 8A through 8D, when the model builder generates the fact table 804, it aggregates data in the fact table 804 rows responsive to the numeric data 412 that the user selected to include in the report. That is, since the user selected Sales quantities 412 but not individual products 410, and since the user selected Cities 406 and Sales Representatives 404 but not Customers 408, the model builder adds Sales quantities 412 from more than one source data 401 row to include in a single row of fact table 804. Specifically, for each row in fact table 804 the model builder adds Sales quantities in source data 401 for both types of Products 412, i.e., cars and vans, and for all Customers in the row's corresponding City. So in fact table 804 first row in FIG. 8C, for example, the Sales quantity is 10, which is the sum of the 4 car sales and 2 van sales for Saetek, and 2 car sales and 2 van sales for Felectrics in four of the source data 401 rows.

Alternatively, the model builder may generate rows in fact table 804 for each of these four rows, resulting in a fact table containing the same number of rows as the numeric data 412 in the originally selected source data 401. Even without aggregating numeric data, however, the portion of source data 401 that the model builder includes in the model is still limited to only the portion the user selected, so that in the example of FIG. 8C the model still does not include columns in dimension tables for Customers 408 and Product types 410.

Next, as shown in FIG. 8D, responsive to the user adding another non-metric column from source data 401, i.e., Product 410 type in this example, the model builder creates a new dimension. In this case, since Product 410 has an N to N relationship with the other data 402, 404, 406, 408 and 412, the model builder creates a new dimension table 808 for this dimension (also referred to as "D2"). To link this new dimension to the existing data in the model, the model builder generates a new key for each unique Product 410, which the model builder includes in a column of dimension table 808; creates a new key column for fact table 804; and includes in the new key column of fact table 804 a respective one of the new keys for each corresponding row of Sales 412 quantity. Also, since the model builder earlier aggregated Sales quantity data for car and van Product types, as explained above, and since the user has subsequently selected to include Product types 410 in the report, the model builder now adds rows to the fact table 804 that it generated in FIG. 8C. That is the model builder now generates a fact table 804 shown in FIG. 8D having twice as many rows, wherein respective Sales quantities 412 are provided for each of the two Product types 410 for each Sales Representative 404 and City 406.

According to embodiments of the present invention, the model builder generates an OLAP model having references that point to numeric source data 401 the user selects for the report, such as source data 401 cell addresses, rather than including the numeric data itself. Rather than including the quantity "4" in the first row of quantities in fact table 804 of FIG. 8D, for example, the model builder may include the source data 401 address for that quantity, such as cell "F2" in the example. Otherwise, the model builder includes information about dimensions in the model in some fashion, such as in the fashion presented herein for illustrating one or more embodiments of the present invention.

In another aspect, it is possible there is data that is already in another hierarchy in the model when the user selects the data for the report, but the data is not already in the report before the user selects it. (This may arise, for example, when the user has modified a report to delete the data, or else, for example, the user has generated a new report that doesn't use data that had previously been selected for including in a previous report). If this occurs, then the model builder module automatically removes the selected data from the other hierarchy and creates a hierarchy with the data that the selected data is nested under in the report.

Figure 9:
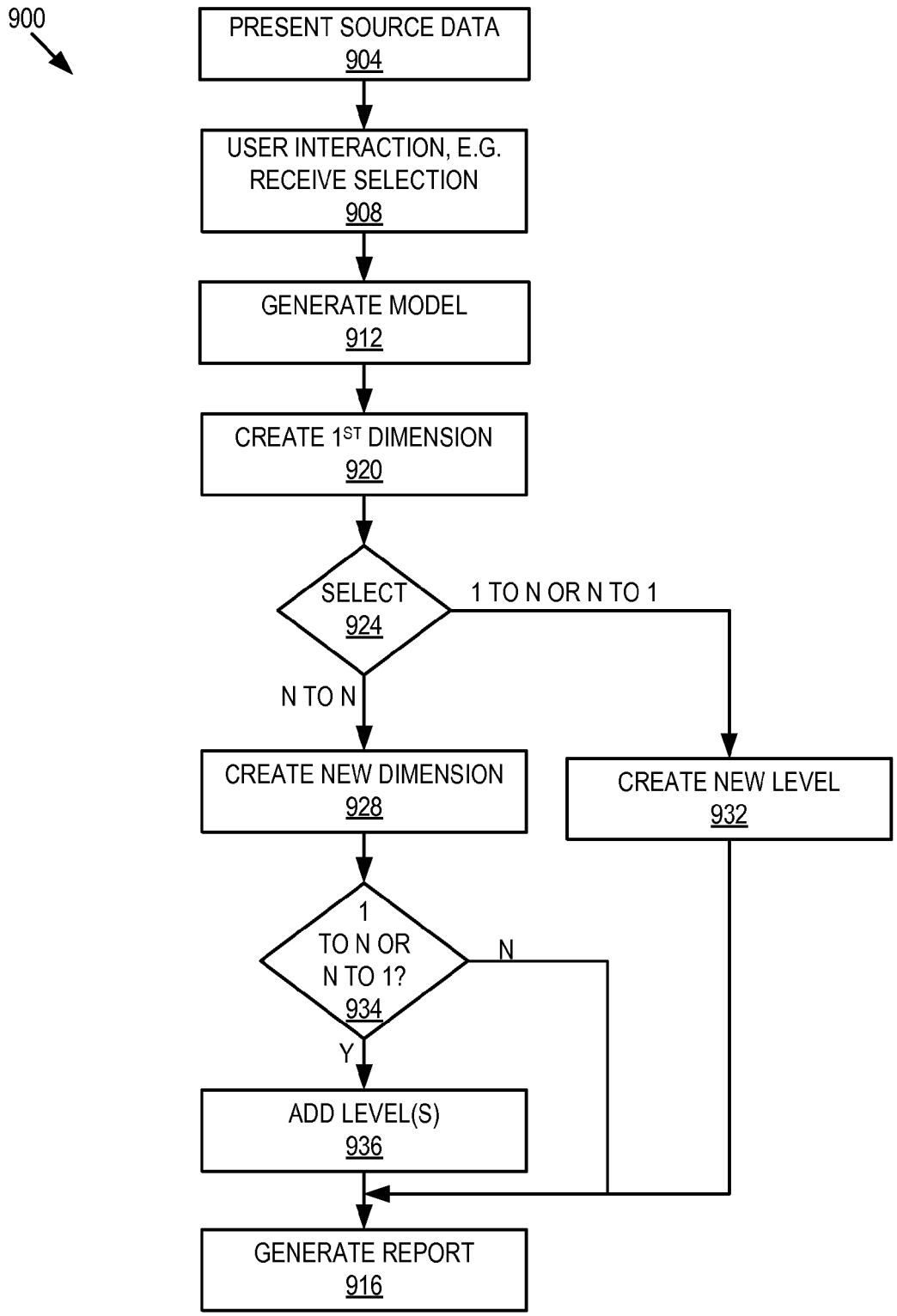
FIG. 9 provides a flow chart illustrating actions by a computer system, according to embodiments of the present invention.

Referring now to FIG. 9, a process 900 is illustrated for dynamically generating a model for a report, which includes a computer system presenting 904 a user with source data in a source application module, wherein the source data is available in the source application module for producing a report or query. User interaction with source data is detected, which includes, for example, selections from the user received 908 by the computer system indicating portions of the source data to potentially include in the report. Other interactions may include the user performing operations on at least some of the source data in an executing application module, including any one or more of operations such as data selecting, manipulating, querying, navigating, changing, displaying, etc. A builder module of the computer system generates 912 an analytic processing model for user selected portions of the source data in response to the detected user interactions, e.g., the received user selections.

In one instance generating 912 the analytic processing model for the user selected portions of the source data includes the computer system builder module creating 920 a first dimension in the model responsive to the computer system builder module detecting that the user has selected a first user selected source data portion (i.e., an initial user selected source data portion) for potentially including in the report and that the model does not yet include any existing data for the report. In one instance, generating 916 the analytic processing model for the user selected portions of the source data includes the computer system builder module selecting 924 between creating a new dimension in the model or else creating a new level in an existing dimension in the model responsive to the computer system builder module detecting whether data in the first user selected source data portion has a predetermined relationship with a second portion of the source data that is selected by the user, wherein the computer system builder module selects to create 928 a new dimension in the model for a user selected source data portion having an N to N mapping with existing data in the model and wherein the computer system builder module selects to create 932 a new level of an existing dimension when a user selected source data portion has a 1 to N or N to 1 relationship to existing data in the model. Further, when the computer system builder module creates a new dimension for a user selected source data portion, the computer system builder module selects 934 whether to add 936 a new level for the new dimension responsive to the computer system builder module, wherein the level is added responsive to detecting a 1 to N or an N to 1 mapping of the source data portion for which the new dimension is created to other source data that has not yet been user selected for potentially including in the report.

Process 900 further includes, according to illustrated embodiments of the present invention, generating 916 the report by an analytic application module responsive to a user query of the user selected source data portions, wherein the analytic application module uses the analytic processing model to extract data for including in the report from the user selected source data portions, wherein the extracted data satisfies the query.

Once the OLAP model exists for the data in the report (and the extra data that is determined to likely be in the same dimension as data in the report), simple operations like drill up and down can be executed with OLAP speed. Calculations are also possible without model alterations, including, for example, calculations such as number of cars sold plus number of vans sold, as in FIG. 4C and FIGS. 8C and 8D. Much like a raw member, such as number of cars sold, the value shown for a calculation is in the context of the current measure in the report. Calculations are defined as artifacts in the model or directly in the report. An OLAP application module is able to resolve these in the context of an OLAP model by finding values for members within a calculation and then resolving the calculation. The speed and simplicity of OLAP is provided and only requires the model to update when new data is brought into the report.

The OLAP model is saved with the report, so that the model is available to consumers. It is advantageous that the saved model is generated responsive to the user creating the report and that the model is, thereby, minimized to correspond to only the data that is needed for the report. If the report is consumed by a report consumer (a user with no authoring capabilities), then the model is sufficient for everything the user can do with that report, since such a user has no access to the raw data or a fuller model. This can both save space on disk and speed up analysis for the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and application modules that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper application modules, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

Many modifications and variations will be apparent to those of ordinary skill in the art without departing from the scope and spirit of the invention. For example, examples have been presented herein in which a user selects data using a spreadsheet application module, but the invention is not limited to user interaction with data via a spreadsheet. In general, a user may interact with data that is structured such that the user can select portions of the data that go together, such as in a table or tables. Some file formats like CSV present tabular data that is suitably structured, for example. Examples have been presented herein in which a report is generated by a tool that embodies the invention. The tool may present both the report and a view of the underlying data that permits user interaction with the source data, including data selection. IBM Watson Analytics is a good example of such a tool. The tool may also be implemented as a spreadsheet application module, such as by a spreadsheet plugin for example. Also a database application module may present a view of data in a manner that permits a user to interact with the source data as described herein.

The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description, but is not intended to be exhaustive or limited to the invention in the form disclosed.

What is claimed is:

1. A method for dynamically generating a model for a report, the method comprising:

presenting a user with source data by a source application module, the source data being presented to the user by the source application module in a unitary structure of rows and columns, rather than as a plurality of tables, wherein the source data is available for producing a report;

receiving selections from the user indicating portions of the source data to potentially include in the report, the selections including user selected ones of the columns and user selected rows of the respective columns; and generating, by a computer system builder module in response to receiving the user selections, a starschema-based, analytic processing model for the user selected portions of the source data,
where the generating includes the computer system builder module converting the unitary structure of the user selected columns and user selected rows of the source data into a central fact table and dimension tables for the star-schema-based, analytic processing model, and
where the computer system builder module performs the converting automatically, where the automatic converting includes:
the computer system builder module automatically creating the central fact table in response to one of the user selected columns being a column having metric data, including automatically creating respective key columns of the central fact table for respective ones of the dimension tables, and
the computer system builder module automatically selecting between:
automatically adding a column to one of the dimension tables in response to a nesting structure of the user selected ones of the columns and user selected rows of the respective columns, and
creating one of the dimension tables.

2. The method of claim 1, comprising:
generating the report by an analytic application module responsive to a user query of the user selected source data portions, wherein the analytic application module uses the analytic processing model to extract data for including in the report from the user selected source data portions, wherein the extracted data satisfies the query.

3. The method of claim 1, wherein the computer system builder module creating one of the dimension tables includes the computer system builder module creating a first dimension in the model responsive to the computer system builder module detecting that the user has selected an initial user selected source data portion for potentially including in the report and that the model does not yet include any existing data for the report.

4. The method of claim 1, wherein the computer system builder module automatically creating one of the dimension tables is further responsive to the nesting structure including a user selected source data portion having an N to N mapping with existing data in the model.

5. The method of claim 1, wherein the computer system builder module automatically adding a column to one of the dimension tables in response to a nesting structure of the user selected ones of the columns and user selected rows of the respective columns is further responsive to the nesting structure including a user selected source data portion having a 1 to N or N to 1 relationship to existing data in the model.

6. The method of claim 1, wherein the computer system builder module automatically adding a column to one of the dimension tables in response to a nesting structure of the user selected ones of the columns and user selected rows of the respective columns is further responsive to the computer system builder module detecting a 1 to N or an N to 1 nesting structure of the source data portion for which the new dimension is created relative to other source data that has not yet been user selected for potentially including in the report.

7. A computer program product for dynamically generating a model for a report, the computer program product including a computer readable storage medium having instructions stored thereon for execution by a computer system, wherein the instructions, when executed by the computer system, cause the computer system to implement a method comprising:
presenting a user with source data by a source application module, the source data being presented to the user by the source application module in a unitary structure of rows and columns, rather than as a plurality of tables, wherein the source data is available for producing a report;
receiving selections from the user indicating portions of the source data to potentially include in the report, the selections including user selected ones of the columns and user selected rows of the respective columns; and
generating, by a computer system builder module in response to receiving the user selections a star-schema-based, analytic processing model for the user selected portions of the source data,
where the generating includes the computer system builder module converting the unitary structure of the user selected columns and user selected rows of the source data into a central fact table and dimension tables for the star-schema-based, analytic processing model, and
where the computer system builder module performs the converting automatically, where the automatic converting includes:
the computer system builder module automatically creating the central fact table in response to one of the user selected columns being a column having metric data, including automatically creating respective key columns of the central fact table for respective ones of the dimension tables, and
the computer system builder module automatically selecting between:
automatically adding a column to one of the dimension tables in response to a nesting structure of the user selected ones of the columns and user selected rows of the respective columns, and
creating one of the dimension tables.

8. The computer program product of claim 7, wherein the instructions, when executed by the computer system, cause the computer system to implement a method comprising:
generating the report responsive to a user query of the user selected source data portions and responsive to analytic application module instructions, wherein the analytic application module instructions are configured to use the analytic processing model to extract data for including in the report from the user selected source data portions, wherein the extracted data satisfies the query.

9. The computer program product of claim 7, wherein the computer system builder module creating one of the dimension tables includes creating a first dimension in the model responsive to detecting that the user has selected an initial user selected source data portion for potentially including in the report and that the model does not yet include any existing data for the report.

10. The computer program product of claim 7, wherein the builder module automatically creating one of the dimension tables is further responsive to the nesting structure including a user selected source data portion having an N to N mapping with existing data in the model.

11. The computer program product of claim 7, wherein the builder module automatically adding a column to one of the dimension tables in response to a nesting structure of the user selected ones of the columns and user selected rows of the respective columns is further responsive to the nesting structure including a user selected source data portion having a 1 to N or N to 1 relationship to existing data in the model.

12. The computer program product of claim 7, wherein the computer system builder module automatically adding a column to one of the dimension tables in response to a nesting structure of the user selected ones of the columns and user selected rows of the respective columns is further responsive to the computer system builder module detecting a 1 to N or an N to 1 nesting structure of the source data portion for which the new dimension is created relative to other source data that has not yet been user selected for potentially including in the report.

13. A system for dynamically generating a model for a report, the system comprising:
a processor; and
a computer readable storage medium connected to the processor, wherein the computer readable storage medium has stored thereon a program for controlling the processor, and wherein the processor is operative with the program to execute the program for:
presenting a user with source data by a source application module, the source data being presented to the user by the source application module in a unitary structure of rows and columns, rather than as a plurality of tables, wherein the source data is available for producing a report or query;
receiving selections from the user indicating portions of the source data to potentially include in the report, the selections including user selected ones of the columns and user selected rows of the respective columns;
and
generating, by a computer system builder module in response to receiving the user selections, a star-schema-based, analytic processing model for the user selected portions of the source data,
where the generating includes the computer system builder module converting the unitary structure of the user selected columns and user selected rows of the source data into a central fact table and dimension tables for the star-schema-based, analytic processing model, and
where the computer system builder module performs the converting automatically, where the automatic converting includes:
the computer system builder module automatically creating the central fact table in response to one of the user selected columns being a column having metric data, including automatically creating respective key columns of the central fact table for respective ones of the dimension tables, and
the computer system builder module automatically selecting between:
automatically adding a column to one of the dimension tables in response to a nesting structure of the user selected ones of the columns and user selected rows of the respective columns, and
creating one of the dimension tables.

14. The system of claim 13, wherein the processor is operative with the program to execute the program for:
generating the report by an analytic application module responsive to a user query of the user selected source data portions, wherein the analytic application module uses the analytic processing model to extract data for including in the report from the user selected source data portions, wherein the extracted data satisfies the query.

15. The system of claim 13, wherein the computer system builder module creating one of the dimension tables includes the computer system builder module creating a first dimension in the model responsive to the computer system builder module detecting that the user has selected an initial user selected source data portion for potentially including in the report and that the model does not yet include any existing data for the report.

16. The system of claim 13, wherein the computer system builder module automatically creating one of the dimension tables is further responsive to the nesting structure including a user selected source data portion having an N to N mapping with existing data in the model and wherein automatically adding a column to one of the dimension tables in response to a nesting structure of the user selected ones of the columns and user selected rows of the respective columns is further responsive to the nesting structure including a user selected source data portion having a 1 to N or N to 1 relationship to existing data in the model.

17. The system of claim 13, wherein the computer system builder module automatically adding a column to one of the dimension tables in response to a nesting structure of the user selected ones of the columns and user selected rows of the respective columns is further responsive to the computer system builder module detecting a 1 to N or an N to 1 nesting structure of the source data portion for which the new dimension is created relative to other source data that has not yet been user selected for potentially including in the report.

* * * * *